United States Patent [19]
Seer, Jr.

[11] 3,886,410
[45] May 27, 1975

[54] SHORT CIRCUIT PROTECTION APPARATUS FOR A REGULATED POWER SUPPLY

[75] Inventor: Harold George Seer, Jr., Woodbury, N.J.

[73] Assignee: RCA Corporation, New York, N.Y.

[22] Filed: Dec. 21, 1973

[21] Appl. No.: 427,346

[52] U.S. Cl.................. 317/31; 317/33 VR; 323/9
[51] Int. Cl. ............................................. H02h 3/24
[58] Field of Search..... 317/31, 33 VR; 323/9, 22 T

[56] References Cited
UNITED STATES PATENTS
3,399,338  8/1968  Burgert et al.......................... 323/9

OTHER PUBLICATIONS

Benjamin Stopka, "Shorted Load Folds Back Supply Current," Electronics, June 21, 1971, p. 65.

*Primary Examiner*—James D. Trammell
*Attorney, Agent, or Firm*—Eugene M. Whitacre; Mason DeCamillis

[57] ABSTRACT

The protection apparatus of this invention incorporates a semiconductor rectifier poled to cut off the current flow to the regulator transistor of a power supply to protect it from damage upon the occurrence of a short circuit.

9 Claims, 1 Drawing Figure

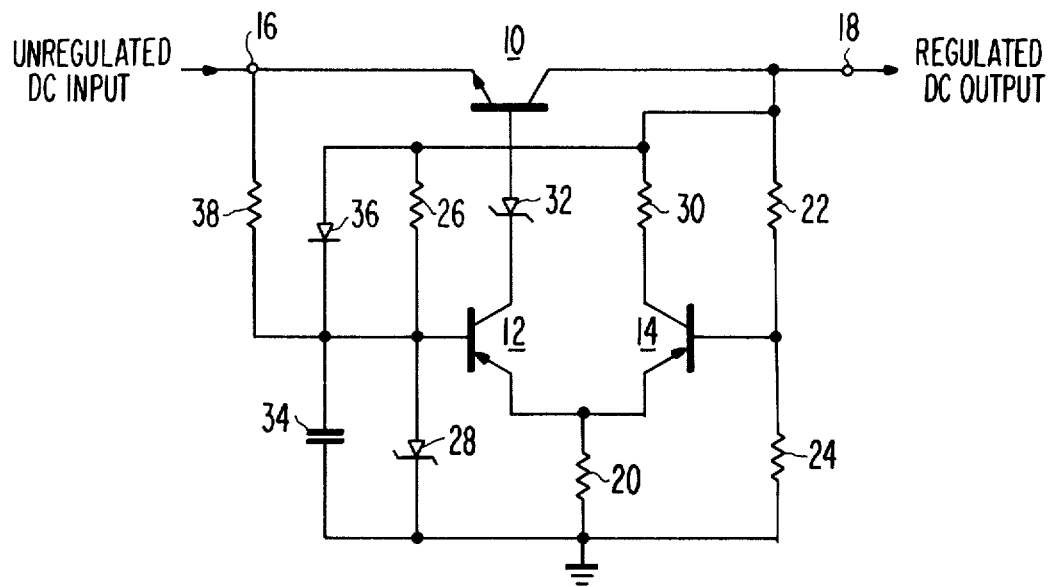

SHORT CIRCUIT PROTECTION APPARATUS FOR A REGULATED POWER SUPPLY

FIELD OF THE INVENTION

This invention relates to regulated power supplies and, more particularly, to a simple, low-cost arrangement for protecting the components of a series-regulated power supply against damage that might be caused by the power surge of a short circuit.

SUMMARY OF THE INVENTION

As will become clear hereinafter, the short circuit protection apparatus of the invention incorporates a semiconductor rectifier for use in a regulated power supply of the type in which a differential amplifier is employed to compare a reference voltage against a voltage derived from the power supply output. Any amplitude difference between the two voltages alters the conductive condition of a series regulator transistor to reduce the voltage difference substantially to zero. As will be seen, the semiconductor rectifier is poled to be nonconductive during normal operation of the regulated power supply, but becomes conductive upon the occurrence of a short circuit. In the conductive state, the rectifier serves to cut off the current flow in the regulator transistor so as to protect it during the short circuit interval.

BRIEF DESCRIPTION OF THE DRAWING

These and other features of the present invention will become clear from a consideration of the following description taken in connection with the accompanying drawing which shows a regulated power supply together with short circuit protection apparatus constructed in accordance with the invention.

DETAILED DESCRIPTION OF THE DRAWING

The power supply of the drawing provides negative, regulated direct voltages and incorporates three transistors 10, 12 and 14. The emitter electrode of transistor 10 is connected to an input supply terminal 16, at which unregulated direct current voltages are to be applied, while its collector electrode is connected to an output terminal 18, at which regulated direct current voltages will be developed. Transistors 12 and 14 are arranged in a differential amplifier configuration, with their emitter electrodes being joined together and coupled to a point of reference or ground potential by a resistor 20. A pair of resistors 22, 24 are serially coupled between the collector electrode of transistor 10 and the ground reference point, with the junction between them being connected to the base electrode of transistor 14. A second series coupling also is illustrated between the collector electrode of transistor 10 and ground, this one including a resistor 26 and a zener diode 28, with the junction between them, at the anode electrode of the zener device, being connected to the base electrode of transistor 12. A further resistor 30 couples the collector electrode of transistor 14 to the collector electrode of transistor 10 while a zener diode 32 couples the collector electrode of transistor 12 to the base electrode of transistor 10, the cathode electrode of zener 32 being at the transistor 12 collector electrode. As will be readily apparent to those skilled in the art, this zener diode 32 is utilized to limit the voltage applied to transistors 12, 14 to a value less than their collector-emitter breakdown voltages. For lower valued input voltages applied at terminal 16 or for higher collector-emitter breakdown voltage transistors, this zener device may be omitted. A resistor 38 is further included between terminal 16 and the base electrode of transistor 12 to supply a "start-up" voltage for the differential transistors 12, 14 when the supply is first turned "on."

As will be appreciated, the output voltage developed at terminal 18 is divided down by the resistors 22, 24 to be compared, by the differential transistors 12, 14, with a reference voltage developed across the zener diode 28. A capacitor 34 is shunted across zener 28 to filter the noise generated by it so as to eliminate the appearance of such noise in the regulated voltage output. Should the output voltage increase from its desired value (become more negative with respect to ground with transistor 10 being of N-P-N and transistors 12 and 14 being of P-N-P variety), the resultant current increase through transistor 14 will decrease the current flow from transistor 12 into the base electrode of transistor 10 to reduce towards its initial value the output voltage developed. Should the output voltage decrease, on the other hand (become less negative with respect to ground), the current through transistor 14 will decrease to provide an increasing collector current from transistor 12 into the base electrode of transistor 10 so as to re-establish the desired output potential. In this respect, it will be noted that the voltage between the base electrode of transistor 12 and ground is maintained substantially constant by zener diode 28 and that the current through the emitter resistor 20 remains substantially constant.

In accordance with the present invention, there is additionally provided a semiconductor rectifier 36 having its anode electrode connected to the output terminal 18 and its cathode electrode connected to the base electrode of transistor 12. Experimentation has shown that upon the occurrence of a short circuit at output terminal 18—and without this rectifier 36—the capacitor 34, for a time, continues to hold a charge to bias transistor 12 into conduction, resulting in the continued application of a current to the base electrode of transistor 10. Where the power supply is to provide a regulated output of some −100 volts (for an unregulated input of some −105 to −140 volts), that current which then will flow through transistor 10 will, in conjunction with the 100+ volts existing across its collector-emitter junction, destroy that series regulating device. Adding a fuse, in the emitter lead of transistor 10, for example, has not proved a satisfactory solution as the rapidity with which transistor 10 will destruct is faster than the finite time it would take for the fuse to respond to the increase in current that results.

With rectifier 36 included, however, a discharge path is provided to the capacitor 34, by means of which its stored charge is rapidly reduced towards zero, and in a manner to bias-off transistor 12. The resulting reduction in current to the base electrode of transistor 10 occurs sufficiently fast such that, at about the time the short circuit would be complete, little, if any, current would be flowing into transistor 10 and the regulating device would be thereby protected.

It will be readily seen that this method of short circuit protection is exceedingly simple and inexpensive; all that is necessary is the addition of one semiconductor rectifier, whose inclusion has substantially no effect on the operation of the regulator in the absence of a short circuit, during which time it is nonconductive. Although the addition of just this single rectifier does not protect the power supply from any degree of overload, it does provide a low-cost means of protecting the series regulating transistor from destruction caused by the power surge of a short circuit, the rectifier being rendered conductive at that time.

While applicant does not wish to be limited to any particular set of component values, the following have proved useful in one embodiment of the invention, incorporated into the power supply of a TK-28 telecine film camera manufactured by the Broadcast Communications Division of the RCA Corporation at Camden, New Jersey.

| Component | Value |
| --- | --- |
| Transistor 10 | 2N3739 |
| Transistor 12 | 2N3634 |
| Transistor 14 | 2N3634 |
| Resistor 20 | 1.5 kilohms |
| Resistor 22 | 51.1 kilohms |
| Resistor 24 | 6.98 kilohms |
| Resistor 26 | 16 kilohms |
| Resistor 30 | 8.25 kilohms |
| Resistor 38 | 220 kilohms |
| Zener Diode 28 | 1N943A |
| Zener Diode 32 | 1N5270A |
| Capacitor 34 | 3.3 microfarads |
| Semiconductor Rectifier 36 | 1N4003 |

While there has been described what is considered to be a preferred embodiment of the present invention, it will be readily apparent that modifications may be made without departing from the teachings herein. By reversing the polarity of the rectifiers shown and by utilizing opposite polarity type transistors, for instance, it will be seen that positive, rather than negative, unregulated direct current input voltages can be controlled in a manner similar to that described above.

What is claimed is:

1. In a regulated power supply of the type in which a pair of transistors are arranged in a differential amplifier configuration to compare a substantially constant voltage with a voltage derived at an output terminal of said supply, in providing control signals to a third transistor in a direction to stabilize said output voltage at a predetermined level, the combination therewith of:
   means including a semi-conductor rectifier coupled between said output terminal and one of said pair of transistors to control it to render said third transistor non-conductive when the voltage provided at said output terminal is indicative of a short circuit condition of said power supply.

2. The combination of claim 1 wherein said means includes a semi-conductor rectifier biased to be non-conductive during normal operation of said power supply, but to be rendered conductive upon the occurrence of a short circuit to cause said one transistor to control said third transistor toward its non-conductive state.

3. In a regulated power supply, the combination comprising:
   first, second and third terminals;
   a first transistor having an input electrode coupled to said first terminal, an output electrode coupled to said second terminal, and a control electrode;
   second and third transistors, each also having input, output and control electrodes, with the output electrode of said second transistor being coupled to the control electrode of said first transistor;
   means for providing an unregulated direct current voltage to said first terminal;
   means for providing a substantially constant direct current voltage to the control electrode of said second transistor;
   means coupled intermediate said second and third terminals for providing a direct voltage to the control electrode of said third transistor for comparison with said substantially constant voltage to provide a control signal for the control electrode of said first transistor to stabilize the direct current voltage developed at said second terminal at a predetermined level; and
   means including a semi-conductor rectifier coupled between said output terminal and the control electrode of said second transistor to alter the conductivity condition of said second transistor in a direction to render said first transistor non-conductive when the voltage provided at said second terminal is indicative of a short circuit condition in said power supply.

4. In a regulated power supply, the combination comprising:
   first, second and third terminals;
   first, second and third transistors, each having emitter, base and collector electrodes;
   direct current connections from the emitter electrode of said first transistor to said first terminal and from the collector electrode of said first transistor to said second terminal;
   a first resistor coupling the emitter electrodes of said second and third transistors to said third terminal;
   means adapted to provide an unregulated direct current voltage to said first terminal;
   first and second coupling paths between said second and third terminals, said first path including second and third resistors connected in series and said second path including a fourth resistor and a zener diode, also connected in series;
   direct current connections from the base electrode of said second transistor to the junction of said fourth resistor and said zener diode and from the base electrode of said third transistor to the junction of said second and third resistors;
   a fifth resistor coupling the collector electrode of said third transistor to said second output terminal;
   means coupling the collector electrode of said second transistor to the base electrode of said first transistor; and
   a semi-conductor rectifier coupled between said second terminal and the base electrode of said second transistor, biased to be nonconductive by said direct current voltage provided during normal operation of said power supply but to be rendered conductive upon the occurrence of a short circuit condition at said second terminal.

5. The combination of claim 4 wherein said first transistor is of a conductivity type opposite from that of said second and third transistors.

6. The combination of claim 5 wherein said first transistor is of N-P-N conductivity type, wherein said second and third transistors are of P-N-P conductivity type, wherein the anode electrode of said zener diode and the cathode electrode of said semi-conductor rectifier are connected to the base electrode of said second transistor, and wherein the cathode electrode of said zener diode is connected to said third terminal.

7. The combination of claim 6 wherein there is further included a sixth resistor and a capacitor serially connected between said first and third terminals, the junction between which is directly connected to the base electrode of said second transistor.

8. The combination of claim 7 wherein said means coupling the collector electrode of said second transistor to the base electrode of said first transistor includes a second zener diode having its anode electrode connected to the base electrode of said first transistor.

9. The combination of claim 8 wherein said means adapted to provide a direct current voltage to the emitter electrode of said first transistor provides a negative direct voltage so as to bias said semi-conductor rectifier to be non-conductive during normal operation of said power supply, but with said semi-conductor rectifier arranged to be rendered conductive upon the occurrence of a short circuit at said second terminal.

* * * * *